US005687327A

United States Patent [19]
Arimilli et al.

[11] Patent Number: 5,687,327
[45] Date of Patent: Nov. 11, 1997

[54] SYSTEM AND METHOD FOR ALLOCATING BUS RESOURCES IN A DATA PROCESSING SYSTEM

[75] Inventors: Ravi Kumar Arimilli, Round Rock; John Michael Kaiser, Cedar Park; William Kurt Lewchuk; Michael Scott Allen, both of Austin, all of Tex.

[73] Assignee: International Business Machines Corporation, Armonk, N.Y.

[21] Appl. No.: 317,007

[22] Filed: Oct. 3, 1994

[51] Int. Cl.⁶ .................................................. G06F 13/36
[52] U.S. Cl. ............................ 395/287; 395/293; 395/729
[58] Field of Search ................................ 395/287, 824, 395/829, 849, 853, 860, 292, 293, 294, 200.05, 200.16, 729

[56] References Cited

U.S. PATENT DOCUMENTS 4,719,567  1/1988  Whittington et al. ................. 395/297
5,265,235  11/1993  Sindhu et al. ......................... 395/447
5,301,282  4/1994  Amini et al. ......................... 395/293
5,392,404  2/1995  Thompson ............................ 395/860
5,404,464  4/1995  Bennett ................................ 395/281
5,416,910  5/1995  Moyer et al. ........................ 395/293

Primary Examiner—Jack B. Harvey
Assistant Examiner—Ario Etienne
Attorney, Agent, or Firm—Kelly K. Kordzik; Winstead Sechrest & Minick P.C.; Anthony V. S. England

[57] ABSTRACT

An efficient multiprocessor address transfer mechanism is utilized within a data processing system including a plurality of bus devices. The present invention places control of the flow of address bus operations within the system controller rather than the bus devices, e.g., a master processor. The system controller issues an address bus grant, in response to an address bus request from a particular bus device, and shortly after that issues another signal notifying the granted bus device that it must now disable the address bus. Furthermore, upon receipt of the signal indicating disablement of the address bus, other bus devices may then snoop, or sample, the address bus.

14 Claims, 3 Drawing Sheets

5,687,327

SYSTEM AND METHOD FOR ALLOCATING BUS RESOURCES IN A DATA PROCESSING SYSTEM

CROSS REFERENCE TO RELATED APPLICATIONS

This application for patent is related to the following applications for patent filed concurrently herewith:

DUAL LATENCY STATUS AND COHERENCY REPORTING FOR A MULTIPROCESSING SYSTEM, Ser. No. 08/316,980;

SYSTEM AND METHOD FOR DETERMINING SOURCE OF DATA IN A SYSTEM WITH INTERVENING CACHES, Ser. No. 08/317,256;

QUEUED ARBITRATION MECHANISM FOR DATA PROCESSING SYSTEM, Ser. No. 08/317,006;

METHOD AND APPARATUS FOR REMOTE RETRY IN A DATA PROCESSING SYSTEM, Ser. No. 08/316,978;

ARRAY CLOCKING METHOD AND APPARATUS FOR INPUT/OUTPUT SUBSYSTEMS, Ser. No. 08/316,976;

DATA PROCESSING SYSTEM HAVING DEMAND BASED WRITE THROUGH CACHE WITH ENFORCED ORDERING, Ser. No. 08/316,979;

COHERENCY AND SYNCHRONIZATION MECHANISMS FOR I/O CHANNEL CONTROLLERS IN A DATA PROCESSING SYSTEM, Ser. No. 08/316,977;

ALTERNATING DATA VALID CONTROL SIGNALS FOR HIGH PERFORMANCE DATA TRANSFER, Ser. No. 08/326,190;

LOW LATENCY ERROR REPORTING FOR HIGH PERFORMANCE BUS, Ser. No. 08/326,203;

Each of such cross-referenced applications are hereby incorporated by reference into this Application as though fully set forth herein.

TECHNICAL FIELD OF THE INVENTION

The present invention relates in general to data processing systems and, in particular, to a system and method for controlling the flow of address bus operations within a data processing system.

BACKGROUND OF THE INVENTION

Within a data processing system including a plurality of bus devices coupled to a system memory via a shared address bus, the address bus is traditionally a bi-directional bus, wherein a master process, having been granted control of the address bus, controls for that period of time all aspects of the address bus resource. For example, when a particular bus device has requested access to the address bus and has been granted such access, the bus device then holds the capability of determining when to enable the address bus, i.e., when the bus device will transmit an operation containing an address. The bus device may also perform several address bus operations before determining to disable the address bus, i.e., releasing it for use by other bus devices. Furthermore, the granted bus device also determines when other bus devices may sample the address placed on the address bus. And, finally, the granted bus device determines when to relinquish ownership of the address bus.

Since the bus device having been granted control of the address bus controls all aspects of the address bus resource, two additional mechanisms must be implemented in order to allow the system controller, which has granted the address bus to the bus device, to efficiently "police" the address bus. First, a specific means must be implemented to indicate to the granted bus device to relinquish the address bus. Second, a general time-out mechanism must be employed within the system controller, or within the bus devices, so that no one bus device may "hog" the address bus.

As can be easily seen, such a system whereby any one bus device can maintain control over the address bus for an almost indefinite time, makes inefficient use of the address bus bandwidth. This especially affects symmetric multiprocessor systems implementing techniques for coherent memory. Thus, there is a need in the art for a more efficient mechanism for controlling utilization of the address bus.

SUMMARY OF THE INVENTION

It is an objective of the present invention to precisely control the flow of address bus operations within a data processing system comprising a plurality of bus devices, thus increasing the useful address bus bandwidth, to provide for low latency and high bandwidth on the address bus, and to be able to "tune" the system bus for different system configurations.

In an attainment of the above objective, a system controller coupled to each of the bus devices, which are coupled via an address bus, issues an address bus grant signal to a bus device that has previously requested the address bus from the system controller. After the address bus grant has been issued to the particular granted bus device, the system controller issues, a fixed number of clock cycles subsequent to the address bus grant, an early address transfer start ("-EATS") signal. This fixed number may be varied to compensate for varying system configurations, e.g., changes in loading on the system bus. While the address bus grant signal informs the bus device that it may enable the address bus, the -EATS signal informs the bus device granted the address bus that it is to now disable the address bus.

Furthermore, the -EATS signal also informs the other bus devices coupled to the address bus that they may now snoop, or sample, the address from the address bus.

An advantage of the present invention is that it allows the system controller, and not the individual bus devices, to control all aspects of the address bus resource. This control of the address bus operations by the system controller is performed on a cycle-by-cycle basis. This minimizes the total "dead" time on the address bus and allows the system controller to efficiently pipeline address bus operations thus increasing the useful address bus bandwidth. Moreover, with respect to multiprocessor systems, the various bus devices can be "ignorant" of loading on the system bus, since the system controller is "aware" of the precise bus loading and controls access times for particular addresses placed there by the bus devices, i.e., the -EATS signal can be enabled at variable times subsequent to an address grant to compensate for bus loading.

Another advantage of the present invention is that it allows the system to run the address bus at an integer multiple of the system clock (1:1, 2:1, 3:1, etc.) based on the address bus topology. This integer multiple can start on any system clock boundary. For example, a system with a two-cycle address bus tenure, operated according to traditional methods, will only begin a new address bus tenure on the next "even" system cycle. With the present invention, the next address bus tenure can occur on the next system cycle, whether "even" or "odd."

Yet another advantage of the present invention is that the address transfer protocol of the present invention may be supported through latch-to-latch implementations, thus allowing the system clock rate to be maximized and improving overall system performance.

And still yet another advantage of the present invention is that it easily supports an address cross bar implementation for supporting coherent multiprocessors.

Yet still another advantage of the present invention is that it permits deeply pipelined address transfers to be supported, since the system controller precisely controls every address bus cycle, and is aware of the fate of the future address bus cycles.

Yet still another advantage of the present invention is that it permits the system controller to dynamically block certain address bus transfers from certain bus devices.

Still another advantage of the present invention is that it prevents "hogging" of the address bus by any one bus device, since each bus device is only permitted, in a preferred embodiment, to perform a single address operation per bus request.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION OF A PREFERRED EMBODIMENT OF THE INVENTION

With the foregoing hardware in mind, it is possible to explain the process-related features of the present invention. To more clearly describe these features of the present invention, discussion of other conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Figure 1:
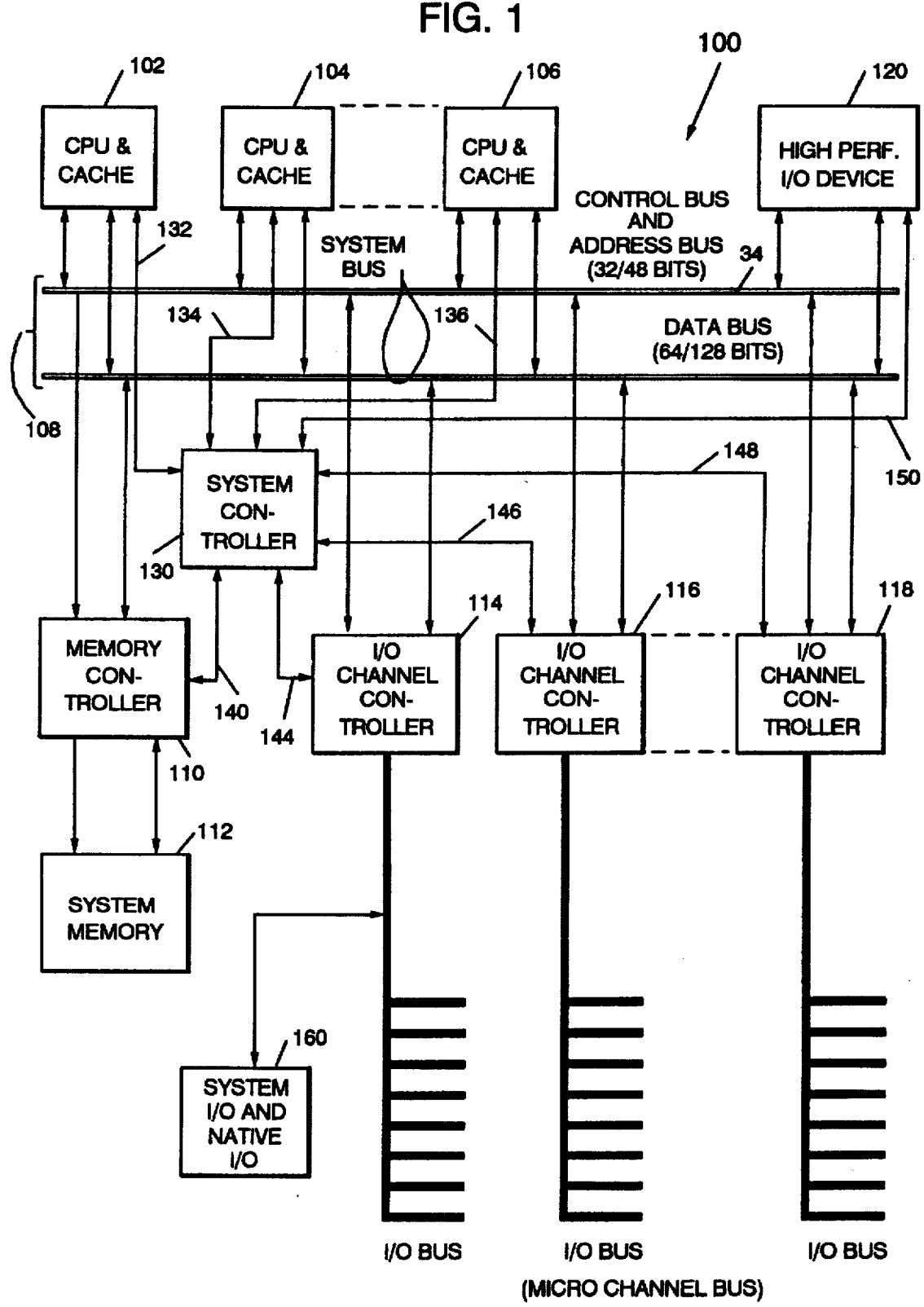
FIG. 1 illustrates a data processing system implemented in accordance with the present invention.

Referring now to FIG. 1, a data processing system which advantageously embodies the present invention will be described. Multiprocessor system 100 includes a number of processing units 102, 104, 106 operatively connected to a system bus 108. Also connected to the system bus 108 is a memory controller 110, which controls access to system memory 112, and I/O channel controllers 114, 116, and 118. Additionally, a high performance I/O device 120 may be connected to the system bus 108. Each of the system elements described 102-120, inclusive, operate under the control of system controller 130 which communicates with each unit connected to the system bus 108 by point to point lines (unidirectional or bidirectional) such as 132 to processor 102, 134 to processor 104, 136 to processor 106, 140 to memory controller 110, 144 to I/O channel controller 114, 146 to I/O channel controller 116, 148 to I/O channel controller 118, and 150 to high performance I/O device 120. Requests and grants of bus access are all controlled by system controller 130.

I/O channel controller 114 controls and is connected to system I/O subsystem and native I/O subsystem 160.

Each processor unit 102, 104, 106 may include a processor and a cache storage device.

As an example, if processor 102 desires access to the address bus (note, the following discussion applies equally well to a data bus, control bus, etc.) within bus 108, it will issue a bus request via connection 132 to system controller 130. System controller 130 implements an arbitration mechanism for determining when a particular bus device will be granted bus 108. This arbitration mechanism is further discussed in U.S. patent application Ser. No. (AT9-94-159), which is cross-referenced herein.

Figure 2:
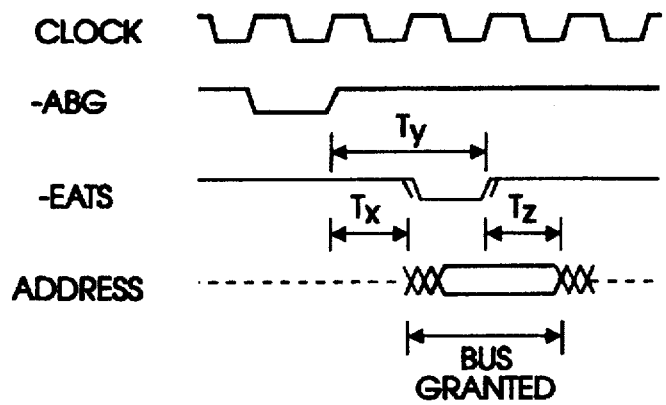
FIG. 2 illustrates a timing diagram in accordance with the present invention.

With reference to both FIGS. 1 and 2, upon determining to grant the bus to processor 102, system controller 130 will drive an address bus grant ("-ABG") signal via connection 132 to processor 102. The -ABG signal informs CPU 102 that it may now enable address bus 34. Each of the bus devices may contain a fixed clock delay before enabling address bus 34 upon receipt of the -ABG signal. This fixed clock delay may be different for different bus devices.

Figure 3:
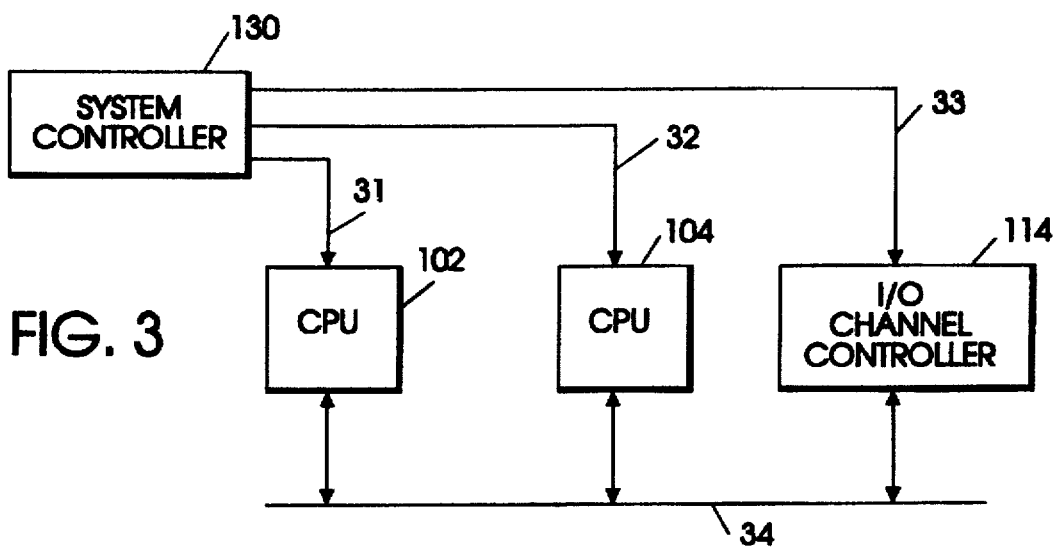
FIG. 3 illustrates an alternative embodiment of the connections between the system controller and the bus devices, with respect to the early address transfer start signal.

After issuing the bus grant signal (or coincidental with an issue of a bus grant signal), system controller 130 drives the -EATS signal to processor 102. Referring to FIG. 3, there is illustrated a portion of system 100, illustrating that system controller 130 may be coupled to processors 102 and 104, and I/O channel controller 114 via point-to-point connections 31–33, respectively, for issuing the -EATS signal.

Figure 4:
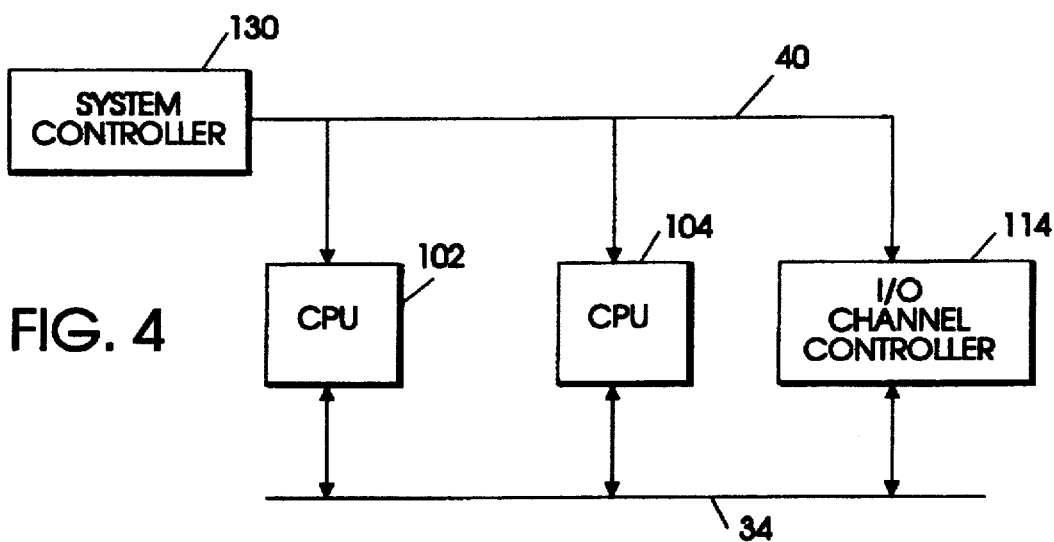
FIG. 4 illustrates an alternative embodiment of the connections between the system controller and the bus devices, with respect to the early address transfer start signal.

Referring next to FIG. 4, this same portion of system 100 is illustrated, except for that point-to-point connections 31–33 have been replaced by bus 40 for transferring the -EATS signal from system controller 130 to the bus devices.

Referring back to FIGS. 1 and 2, the -EATS signal is issued to processor 102 a time period after the issuing of the -ABG signal. This time period may be based on address bus loading/topology. Thus, if the system bus loading is varied, this time period may be varied accordingly, e.g., more devices loaded onto the bus may necessitate lengthening this time period.

The -EATS signal notifies processor 102 that it may now disable address bus 34. However, in order to pipeline address transfers, address bus 34 may remain enabled by processor 102 if another -ABG signal has been received. Furthermore, the -EATS signal informs the other bus devices, i.e., processors 104 and 106, high performance input/output device 120, and input/output channel controllers 114, 116 and 118 that they may now snoop/sample the address from address bus 34, which was placed there by processor 102 during the time period when processor 102 was able to enable address bus 34.

In FIG. 2, time Tx is defined as -ABG to address bus enable. Time Tx may be a fixed number of clock cycles (0, 0.5, 1, 2, etc.) and may be different for different bus devices and further may be configurable for each bus device. Time Ty, -ABG active to -EATS active, may be determined by system controller 130 based on address bus loading/topology. Time Tz is the time processor 102 has from receiving the -EATS signal to disabling address bus 34. Time Tz also represents the time available for the other bus devices to snoop/sample the address. The total address enable time is equal to Ty+Tz−Tx.

In a preferred embodiment, upon receiving the -EATS signal, processor 102 may disable address bus 34 on the following bus cycle, and the other bus devices may sample address bus 34 on the following bus cycle.

In order to reduce address bus latencies, system controller 130 may "speculatively" send -ABG and -EATS to processor 102 (e.g., issuance of an address bus grant without an address bus request). Furthermore, the -ABG signal and/or -EATS signal may remain active for consecutive bus cycles. This maximizes address bus bandwidth by allowing an address operation every bus cycle. Upon receiving an unsolicited -ABG, processor 102 may enable the address bus for an address operation or a "null" operation.

Figure 5:
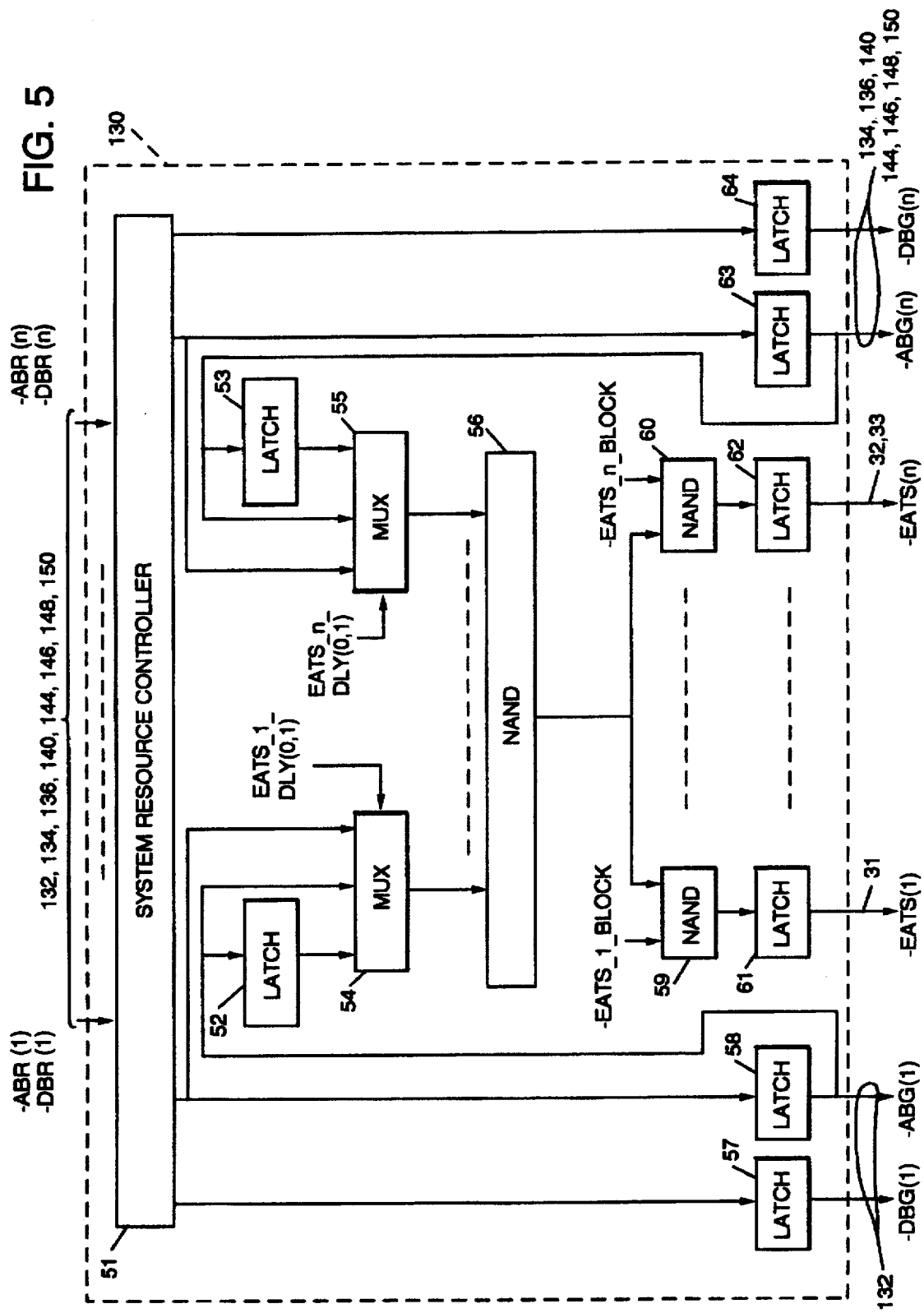
FIG. 5 illustrates a block diagram of system controller 130 in accordance with the present invention.

Referring next to FIG. 5, there is illustrated a preferred embodiment of system controller 130 implementing the -EATS protocol. Address, data and control bus requests are received via connections 132, 134, 136, 140, 144, 146, 148 and 150 from bus devices 102, 104, 106, 110, 114, 116, 118 and 120, respectively. These requests are received by a portion of system controller 130, herein referred to as system resource controller 51. System resource controller 51 implements arbitration and other various protocols, which are the subject of the cross-reference patents. The data bus grants are latched through latches 57–64, while the address bus grants are latched through latches 58–63. If an address grant is issued, for example through latch 58 for a grant of system bus 108 to processor 102, latch 52 and multiplexor 54 are utilized along with an EATS_1_DLY(0,1) signal in order to begin the process of transmitting an -EATS signal on the point-to-point connections to each of the other devices. The EATS_1_DLY(0,1) through EATS_n_DLY(0,1) bits are configurable to allow system controller 130 to delay the -EATS signal a programmable number of cycles subsequent to the -ABG signal. This permits system controller 130 to efficiently support a variety of devices and system structures, as discussed above. For example, if the signal EATS_i_DLY(0,1) is encoded as 0,0, then the -EATS signal will be sent by system controller 130 on the same cycle as the -ABG signal. However, if the EATS_i_DLY(0,1) is encoded as a 0,1, then the -EATS signal will be sent by system controller 130 one cycle subsequent to the sending of the -ABG signal. Finally, if the EATS_i_DLY(0) is a 1, then the -EATS signal will be sent by system controller 130 two cycles subsequent to the -ABG signal.

Note that latch 53 and multiplexor 55 operate in a manner similar to latch 52 and multiplexor 54 for the other bus devices. The output from multiplexor's 54–55 are sent to NAND circuit 56, which then outputs a signal to NAND circuits 59–60. NAND circuits 59–60 may be optionally provided with a EATS_i_BLOCK signal which implements a selective blocking of certain address transfers to specific system bus devices by blocking the appropriate -EATS signal. For example, the -EATS signal to processor 102 may be blocked by asserting the EATS_1_BLOCK signal into NAND circuit 59.

The outputs of circuits 59–60 are provided to latch circuits 61–62, respectively, which output the -EATS signals to the individual bus devices.

Although the present invention and its advantages have been described in detail, it should be understood that various changes, substitutions and alterations can be made herein without departing from the spirit and scope of the invention as defined by the appended claims.

What is claimed is:

1. In a data processing system comprising a plurality of bus devices coupled via a bus, wherein said plurality of bus devices includes one or more processors, and wherein a system controller is coupled to each of said plurality of bus devices, a method comprising the steps of:

issuing a bus grant to one of said plurality of bus devices, said bus grant issued from said system controller to said one of said plurality of bus devices, said bus grant issued in response to a bus request received by said system controller from said one of said plurality of bus devices; and issuing an early address transfer start signal to said one of said plurality of bus devices, said early address transfer start signal issued from said system controller to said one of said plurality of bus devices.

2. The method as recited in claim 1, further comprising the step of:

enabling, by said one of said plurality of bus devices, said bus in response to said bus grant.

3. The method as recited in claim 2, further comprising the step of:

disabling, by said one of said plurality of bus devices, said bus in response to said early address transfer start signal.

4. The method as recited in claim 1, wherein said bus is an address bus, and further comprising the steps of:

sending said early address transfer start signal to other ones of said plurality of bus devices; and sampling, by said other ones of said plurality of bus devices, of said address bus in response to said early address transfer start signal.

5. The method as recited in claim 4, further comprising the step of:

blocking said sending of said early address transfer start signal to selected ones of said other ones of said plurality of bus devices.

6. The method as recited in claim 1, further comprising the step of:

issuing said early address transfer start signal to other ones of said plurality of bus devices.

7. A data processing system comprising a plurality of bus devices coupled via a bus, wherein said plurality of bus devices includes one or more processors, and wherein a system controller is coupled to each of said plurality of bus devices, said system controller further comprising:

first means for signalling one of said plurality of bus devices to enable said bus, wherein said first means for signalling further comprises means for issuing a bus grant to said one of said plurality of bus devices, said bus grant issued from said system controller to said one of said plurality of said bus devices, said bus grant issued in response to a bus request received by said system controller from said one of said plurality of bus devices; and second means for signalling said one of said plurality of bus devices to disable said bus, wherein said second means for signalling further comprises means for issuing an early address transfer start signal to said one of said plurality of bus devices, said early address transfer start signal issued from said system controller to said one of said plurality of bus devices.

8. The system recited in claim 7, wherein said one of said plurality of bus devices further comprises:

means for enabling said address bus in response to said address bus grant.

9. The system recited in claim 7, wherein said one of said plurality of bus devices further comprises:

means for disabling said address bus in response to said early address transfer start signal.

10. The system recited in claim 7, wherein said bus is an address bus, and wherein one or more of said plurality of bus devices further comprises:

means for sampling of said address bus in response to said early address transfer start signal.

11. The system recited in claim 7, wherein said system controller is coupled to said plurality of bus devices in a point-to-point manner.

12. The system recited in claim 7, wherein a bus grant and said early address transfer start signal are sent speculatively.

13. The system recited in claim 7, wherein said plurality of bus devices includes one or more I/O channel controllers and said system further comprises a system memory coupled to said address bus.

14. In a data processing system comprising a plurality of bus devices and a system memory coupled via an address bus, wherein said plurality of bus devices includes one or more processors, and wherein a system controller is coupled to each of said plurality of bus devices, a method comprising the steps of issuing an address bus grant to one of said plurality of bus devices, said address bus grant issued from said system controller to said one of said plurality of bus devices, said address bus grant issued in response to a bus request received by said system controller from said one of said plurality of bus devices; enabling, by said one of said plurality of bus devices, said address bus in response to said address bus grant; issuing an early address transfer start signal to said one of said plurality of bus devices, said early address transfer start signal issued from said system controller to said one of said plurality of bus devices; disabling, by said one of said plurality of bus devices, said address bus in response to said early address transfer start signal; and sampling, by one or more of said plurality of bus devices, of said address bus in response to said early address transfer start signal.

\* \* \* \* \*